United States Patent
Nobis et al.

(10) Patent No.: US 8,452,552 B2
(45) Date of Patent: May 28, 2013

(54) METHOD FOR TESTING A VIBRATION DAMPER OF A MOTOR VEHICLE IN THE INSTALLED STATE, AND VIBRATION DAMPER-TEST SYSTEM FOR A MOTOR VEHICLE

(75) Inventors: Guenter Nobis, Nuertingen (DE); Daniel Wegener, Aachen (DE); Steffen Abraham, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 289 days.

(21) Appl. No.: 12/455,776

(22) Filed: Jun. 4, 2009

(65) Prior Publication Data

US 2009/0312966 A1  Dec. 17, 2009

(30) Foreign Application Priority Data

Jun. 17, 2008 (DE) .......................... 10 2008 002 484

(51) Int. Cl.
*G01M 17/00* (2006.01)
*G01M 17/04* (2006.01)
(52) U.S. Cl.
CPC ..................... *G01M 17/04* (2013.01)
USPC .......... 702/56; 73/11.05; 73/1.82; 73/862.41; 73/862.59; 73/514.14; 73/11; 73/574; 73/669; 188/378; 188/379; 188/380; 188/166; 188/174; 188/267; 267/140.11; 74/11; 701/37; 701/48; 701/91; 701/111

(58) Field of Classification Search
USPC ........... 702/56; 74/11; 267/140.11; 73/11.05; 701/37, 48, 91, 111
See application file for complete search history.

(56) References Cited

U.S. PATENT DOCUMENTS

| | | | | | |
|---|---|---|---|---|---|
| 4,376,387 | A | * | 3/1983 | Stevens et al. | 73/11.07 |
| 5,189,615 | A | * | 2/1993 | Rubel et al. | 701/37 |
| 5,767,382 | A | * | 6/1998 | Buchanan | 73/11.08 |
| 6,161,419 | A | * | 12/2000 | Langlechner | 73/11.08 |
| 6,819,979 | B1 | * | 11/2004 | Schwarz et al. | 701/1 |
| 2007/0294017 | A1 | * | 12/2007 | Joshi et al. | 701/67 |

FOREIGN PATENT DOCUMENTS

| | | |
|---|---|---|
| DE | 43 05 048 | 8/1994 |
| EP | 0 611 960 | 8/1994 |

\* cited by examiner

*Primary Examiner* — Sujoy K Kundu
*Assistant Examiner* — Haidong Zhang
(74) *Attorney, Agent, or Firm* — Kenyon & Kenyon LLP

(57) ABSTRACT

A method for checking a vibration damper of a motor vehicle in the installed state includes setting start values of the damping constant kA, the spring rate cA, and the body mass mA for a wheel of a motor vehicle; inducing a vertical vibration of the motor vehicle with the aid of a defined excitation $sR_{real}$; determining the theoretical body vibration excursion $sA_{model}$; optically detecting the positions of the wheel and the body shell of the motor vehicle at a plurality of detection instants during the vibration; minimizing the error function formed from the deviations between the theoretical body vibration excursion $sA_{model}$ and the observed body vibration excursion $sA_{real}$ at the detection instants, and determining the damping constant kA, the spring rate cA, and the body mass mA therefrom; and determining the damping measure θ of the vibration damper.

7 Claims, 4 Drawing Sheets

METHOD FOR TESTING A VIBRATION DAMPER OF A MOTOR VEHICLE IN THE INSTALLED STATE, AND VIBRATION DAMPER-TEST SYSTEM FOR A MOTOR VEHICLE

BACKGROUND OF THE INVENTION

1. Field of the Invention

The present invention relates to a method for testing a vibration damper of a motor vehicle in the installed state, and to a vibration damper test system for a motor vehicle.

2. Description of Related Art

Conventional vibration dampers include a spring as well as a damping element and are used both to ensure the driving safety of a motor vehicle and to optimize the driving comfort. The driving safety is heavily influenced by the road grip of the tires. Vibrations of the tire masses are therefore often minimized by strong damping. On the other hand, satisfactory driving comfort requires rather weak damping. A comprise between hard safety damping and soft comfort damping must therefore be sought when configuring vibration dampers.

A vibration damper installed in the motor vehicle is subject to wear in the course of the driving operation and changes its vibration behavior and its damping characteristic, so that a safety-critical state is frequently reached after a period of time.

To check the performance of vibration dampers, they can be uninstalled and measured on a separate test stand. This test method does indeed supply precise test results but it is impractical for time and cost reasons because of the deinstallation work and therefore is used very infrequently.

From the published European patent document EP 0 611 960 B1 and published German patent document DE 43 05 048 A1, a method for testing a vibration damper of a motor vehicle is known, in which vibrations are introduced into the motor vehicle's wheel suspension, in which the vibration damper to be tested is situated, via a vehicle wheel standing on a wheel contact patch, the vibrations being brought about by base point excitation vibrations; the damping behavior is determined in the process in that the differences from the motional amplitudes and the motional speeds of the wheel and of the vehicle body are related to the acceleration of the wheel or the dynamic vertical force, and the damping coefficient is estimated from this relation in that, for testing the quality of the vibration damper, the estimated damping coefficient is compared to a reference value and for the quality test it is determined whether a deviation from the reference value lies within a tolerance range.

This requires complex test stand actuator systems, which induce vibrations of the motor vehicle. Furthermore, it has become apparent that the reproducibility of the measurements is not always ensured, and that the measured values for the vibration damper describe the damping characteristic only to an unsatisfactory degree.

BRIEF SUMMARY OF THE INVENTION

It is an object of the present invention to provide a method as well as a system for testing a vibration damper of a motor vehicle in the installed state, by which the installed vibration damper is able to be tested and evaluated in a time- and cost-effective manner, and by which faulty vibration dampers are able to be identified reliably.

The method for testing a vibration damper of a motor vehicle in the installed state proceed from an analysis of the vehicle vibration in response to a random unevenness excitation as a single-degree of freedom system for the model-supported evaluation.

The use of the method according to the present invention for testing a spring, and the use of a vibration damper including a damping element enables a separate evaluation of the state of the installed vibration damper, and a determination of the relevant parameters of damping constant, spring rate, body mass and damping measure with sufficient precision. Damaged dampers may thus be identified in a reliable manner.

According to the present invention, the movement of wheel and body shell is detected using optical measuring technology, and a vertical vibration of the motor vehicle must be induced with the aid of a defined excitation, in particular only a single excitation.

The method of the present invention with the optical detection of the position of the wheel and the body shell at a plurality of detection instants during the vibration is basically suitable for any vibration excitation. The excitation may take place with a minimum of effort by driving across one or a plurality of floor boards or thresholds or driving on conventional vibration damper plate-test stands, for instance by shifting the wheel contact patch on which the motor vehicle is standing, vertically by a specific distance.

If a vertical vibration of the motor vehicle is induced by driving across a threshold, then the wheel or body shell movement is able to be measured while the vehicle is driving over this threshold. According to the present invention, the term threshold is used as generic term for all excitation devices that a motor vehicle drives across and which temporarily shift the wheel vertically in so doing. Any obstacles such as steps and the like are to be understood as threshold according to the present invention. The use of a threshold for vibration excitation according to the present invention thus dispenses with a complex test stand actuator system for causing the motor vehicle to vibrate, and the required motional energy is generated by the motor vehicle itself in this case.

According to the present invention, the evaluation of the vibration damper is implemented on the basis of a model-based analysis of the measured wheel and body shell movement, using differential equations to determine the parameters for the damping constant or body damping constant, for the spring rate or body spring rate, and for the body mass, and the damping measure is able to be calculated from these parameters. The damping measure, which is also referred to as damping ratio or Lehr's damping, correlates the magnitude of the axle damping with the body mass and the spring rate. The damping measure is a dimensionless variable and makes it possible to evaluate the damping exhibited within a vibration system while taking the relevant vibration parameters into account. The damping measure is suitable for comparing vibration dampers of different vehicles to each other in an objective manner and for checking them for compliance with limit values for the driving safety.

In contrast to current conventional test methods, in the vibration damper testing according to the present invention the measuring variable of the vertical wheel force plays no role, which simplifies the test system and dispenses with complex test stand actuator systems and sensors for measuring vertical wheel forces.

Moreover, according to the present invention, the relative movements between motor vehicle wheel and body shell are evaluated, so that the interfering effect of the tire on the test result is eliminated. This simplifies the vibration model, in which a so-called single-degree of freedom system is evaluated instead of a two-degrees of freedom system, a considerable improvement of the evaluation of the state of the vibration dampers being achieved at the same time.

According to the present invention, the movements of the body shell or the vehicle body and the vehicle wheel are subsequently determined from the measured image data, based on a plurality of acquisition instants. These motion variables with their time- and excursion dependency serve as basis for the evaluation of the vibration dampers.

The use of the method according to the present invention makes it possible to detect the state of the vibration dampers in the installed state in an uncomplicated manner. A separate evaluation of the four vibration dampers is possible, so that differences are detected directly. Because of the simple measuring method and the rapid processing of the evaluation algorithm in the computing unit of the measuring system, the results are available immediately after implementing the measurement, which constitutes a considerable advantage in comparison with the existing test approaches.

The present invention also relates to a method for testing the vibration dampers of at least one axle of a motor vehicle in the installed state, in which the method for testing a vibration damper of a motor vehicle in the installed state is carried out in succession according to the manner described for the wheels of the particular axle in order to determine the damping measures or the damping of the axle, and in which the lifting, pitching and rolling motions of the body measurements are taken into account. The method according to the present invention for testing a vibration damper of a motor vehicle in the installed state is thus also able to be expanded to a single-track model or to a four-wheel vehicle model.

In addition, the present invention also relates to a vibration damper test system for a motor vehicle, having at least one measuring head for the optical detection of the position of a wheel and the body shell of the motor vehicle at a plurality of detection instants, an excitation device for inducing a vertical vibration of the motor vehicle, in particular a threshold for the vehicle to drive over, as well as a data processing unit. It is connected to the measuring head and configured to receive measuring data from the particular measuring head, and to implement a method for testing a vibration damper of a motor vehicle in the installed state of the type described above.

DETAILED DESCRIPTION

Figure 1:
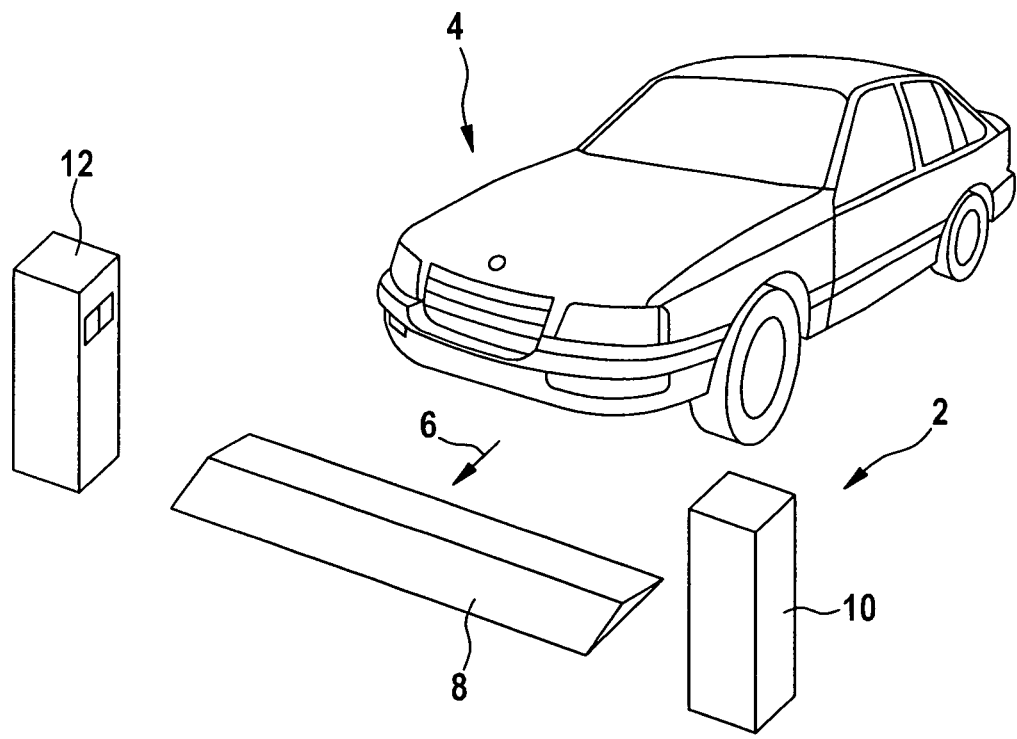
FIG. 1 shows a measuring system according to the present invention and a test vehicle whose vibration dampers are to be tested according to the present invention.

FIG. 1 shows a schematic representation of a measuring system 2 according to the present invention with a test vehicle 4 whose vibration dampers are to be tested according to the present invention.

Measuring system 2 includes a longitudinal threshold having a defined height whose main extension direction is basically situated at a right angle to movement direction 6 of test vehicle 4. The width of threshold 8 corresponds to at least the width of test vehicle 4, so that when test vehicle 4 is crossing threshold 8 in movement direction 6, threshold 8 causes a defined excitation of both wheels of the same axle, which are thereby made to vibrate vertically.

On the side next to threshold 8, either at the height of threshold 8 or shortly thereafter, a left measuring head 10 and a right measuring head 12 are disposed, each of which includes a measuring camera pointing to the interior, e.g., CCD sensors, which are mounted at a suitable height and are able to optically detect the position of the wheel and the body shell of the motor vehicle, in particular specific features on the wheel, e.g., the rim flange or specific bore holes, and on the body shell, e.g., the edge of the fender.

Figure 2:
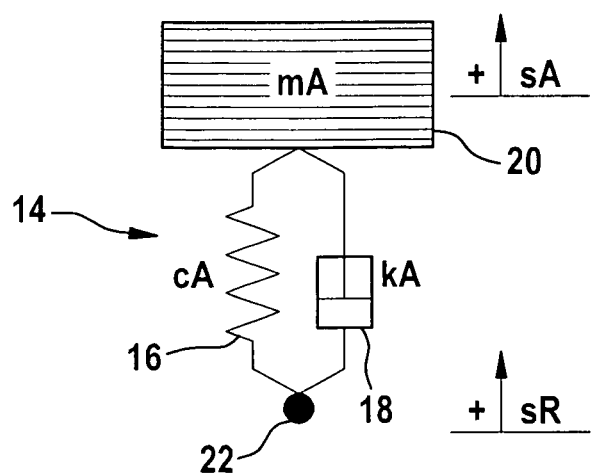
FIG. 2 shows a block diagram of a vibration model.

FIG. 2 shows a block diagram of a vibration model 14.

Vibration model 14 is an excursion-excited single-degree of freedom system (EMS) by which the vibration between the vehicle body and the motor vehicle wheel is able to be described. Vibration model 14 constitutes the analysis of a quarter vehicle, i.e., one axle side having the proportional body mass mA.

The vehicle mass or body mass mA is denoted by reference numeral 20 and schematically shown as a rectangle. Wheel axle 22 or the wheel suspension is denoted by reference numeral 22. The vibration damper is formed by spring 16 having spring rate cA and parallel damping element 18 having damping factor kA, body mass 20 being suspended on wheel axle 22 by this vibration damper.

The direction of movement of the vehicle wheel or wheel movement sR is illustrated by an arrow pointing up, and the direction of movement of the vehicle body or body movement sA is likewise illustrated by an upwardly pointing arrow.

Moreover, measuring system 2 has a data processing unit, which receives the measured values from the measuring cameras of measuring heads 10 and 12, and which is configured to implement the method according to the present invention.

Measuring system 2 may have the capability of inputting data, by which data for the vehicle to be tested is able to be input either manually via a connected keyboard, or via data coupling with another computer, or by reading it in from a storage medium.

Body mass 20 is excited to vibrate because of the movement of the vehicle wheel and the transmission by the vibration damper.

The vibration of the excursion-excited single-degree of freedom system shown in FIG. 2 can be described by the following differential equation:

$$mA \cdot \ddot{s}A + kA \cdot (\dot{s}A - \dot{s}R) + cA \cdot (sA - sR) = 0$$

This differential equation is a homogenous equation; variables mA, kA and cA may each be multiplied by a common factor without changing the result of the differential equation.

During the parameter determination, one of the three variables mA, kA and cA must be known and cannot be determined in the optimization. A joint determination of all three parameters is not possible.

In practice, vehicle mass mA is assumed to be known, and only damping factor kA and spring rate cA are determined in the optimization.

If this differential equation is divided by body mass mA, then the following formulation of the differential equation results:

$$\ddot{s}A + 2 \cdot \delta (\dot{s}A - \dot{s}R) + \omega_0^2 \cdot (sA - sR) = 0$$

δ represents the decay constant $$\delta = \frac{kA}{2 \cdot mA},$$

and $\omega_0$ the natural angular frequency $$\omega_0 = \sqrt{\frac{cA}{mA}} \text{ with } \omega = 2\pi \cdot f = \frac{2\pi}{T} \text{ and } f_0 = \frac{1}{2\pi}\sqrt{\frac{cA}{mA}}$$

the natural frequency.

The natural angular frequency is therefore defined by spring rate cA and by body mass mA, and is not affected by the damping. The natural angular frequency normally lies just below 2 Hz.

Figure 3:
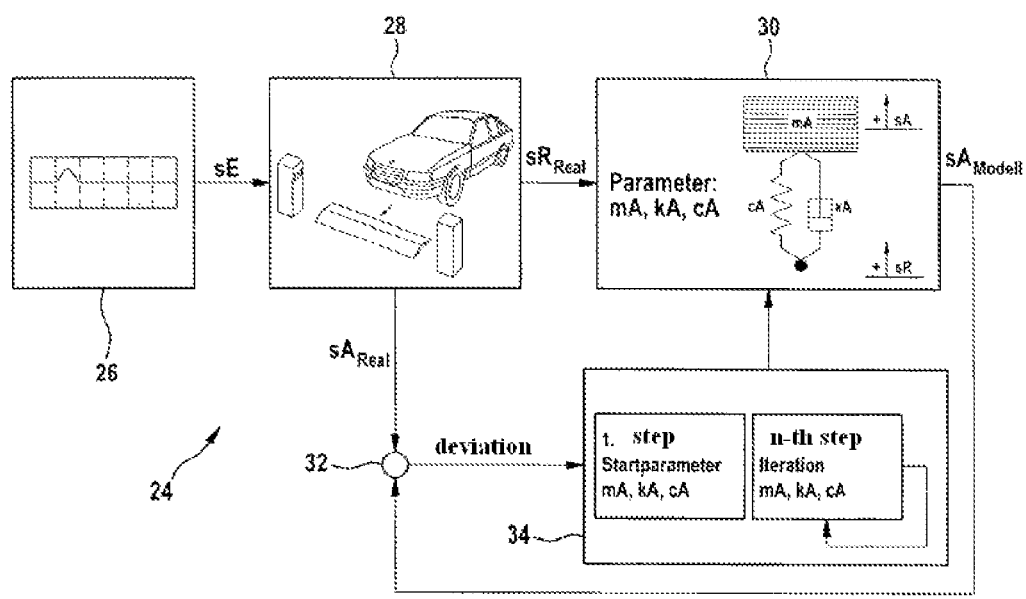
FIG. 3 shows a flow chart of a first method according to the present invention for testing a vibration damper of the test vehicle from FIG. 1.

FIG. 3 shows a flow chart 24 of a first method according to the present invention for testing a vibration damper of test vehicle 4.

At the start of the method, start values of damping constant kA, spring rate cA, and body mass mA are determined for the wheel of the vehicle to be evaluated. Limit values may be defined for these parameters in addition. In the simplest case, such start and limit values may be derived from empirical values, be estimated from available vehicle data for an optimization, or be determined more precisely by preceding measurements, e.g., of the vehicle mass or the wheel load.

In the first method step a vibration excitation 26 takes place in that the respective wheel of test vehicle 4 drives across threshold 8. Defined excitation sE causes a vertical vibration of test vehicle 4, which vibration is damped by damping element 18 of the respective vehicle wheel.

In the second method step, measurement 28 is carried out by measuring heads 10 and 12. In the process, the wheel to be evaluated and the adjacent body shell of test vehicle 4 are viewed by the cameras of measuring heads 10 and 12 situated directly opposite, and the positions of the wheel and the body shell are optically acquired during the vibration.

In the next method step, simulation model 30 calculates the theoretical body vibration excursion $sA_{model}$; used as parameters are defined excitation $sR_{real}$, the vehicle mass for particular vehicle wheel mA, damping constant kA and spring rate cA.

The vehicle movement ($sR_{real}$, $sA_{real}$) is measured by measuring head 10 or 12 lying opposite the vehicle wheel to be evaluated.

Calculated body vibration excursion $sA_{model}$ is obtained as model output variable as the result of simulation model 30. Parallel thereto, actual body vibration excursion $sA_{real}$ is monitored and compared to calculated body vibration excursion $sA_{model}$ at the different acquisition instants. In particular, a difference between monitored body vibration excursion $sA_{real}$ and calculated body vibration excursion $sA_{model}$ is calculated in method step 32, and a characteristic value is calculated from such a deviation.

This deviation may be described with the aid of an error function, in particular, e.g., by the error function defined as follows, which forms the sum of the error squares between model and measurements:

$$\Delta = \sum_{i=1}^{n}(sA_{real,i} - sA_{Modell,i})^2$$

This non-linear error function having a plurality of variables may be minimized by using mathematical methods known to one skilled in the art. Obtained as a result are measured values for damping constant kA, for spring rate cA, and for body mass mA, and from this the damping measure of the vibration damper is able to be determined according to the following formula:

$$\vartheta = \frac{\delta}{\omega_0} = \frac{kA}{2\sqrt{cA \cdot mA}}$$

In the method step of model parameterization 34, the particular parameters for damping constant kA, spring rate cA, and body mass mA that constitute an optimal cover between real and model-based body movement are calculated.

Method steps 26, 28, 30, 32 and 34 of flow chart 24 may be repeated; the values for damping constant kA, spring rate cA, and body mass mA determined in model parameterization 34 are used as start values in each instance.

In the method for testing a vibration damper of a motor vehicle in the installed state according to the present invention shown in FIG. 3, a vibration model is thus established in which the parameters for body mass mA, damping constant kA, and spring rate cA are kept variable, in which the parameterization of the vibration model takes place in an iterative process, and in which the damping measure for the vibration system is able to be determined with the aid of the ascertained parameters. That is to say, the particular parameters are sought that simulate the vibration characteristic as best as possible.

According to a second method of the present invention for testing a vibration damper of a motor vehicle in the installed state, the method not being shown in FIG. 3, a vertical vibration of the motor vehicle is first induced by a defined excitation $sR_{real}$, for instance by test vehicle 4 driving over threshold 8; the positions of the wheel and the body shell of test vehicle 4 are then optically acquired during the vibration at a plurality of detection instants. Then, a differential equation system describing the vibration of the vibration damper at the detection instants is set up. Using mathematical methods that are known to one skilled in the art and which need not be described here in greater detail, the unknown variables of decay constant and natural angular frequency are determined from this, and finally it is possible to determine the body damping measure of the vibration damper on this basis.

The unknown variables of decay constant and natural angular frequency, in particular, are able to be determined with the aid of a parameter estimation method known to one skilled in the art and not described here in greater detail. Using this parameter estimation method, the optimal solution for the parameters of decay constant and natural angular frequency are determined, so that the differential equation system for each measured value of the wheel and body shell movement is satisfied, as illustrated in the following equation.

$$\sum_{i=1}^{n} [\ddot{s}A_i + 2 \cdot \delta \cdot (\dot{s}A_i - \dot{s}R_i) + \omega_0^2 \cdot (sA_i - sR_i)]^2 \to 0$$

The damping measure may be determined on the basis of the decay constant and the natural angular frequency according to the aforementioned formula.

The method according to the present invention for testing a vibration damper of a motor vehicle in the installed state is also able to be expanded to a single-track model in which the wheels of the front and rear axle are analyzed simultaneously, or to a four-wheel vehicle model.

Figure 4:
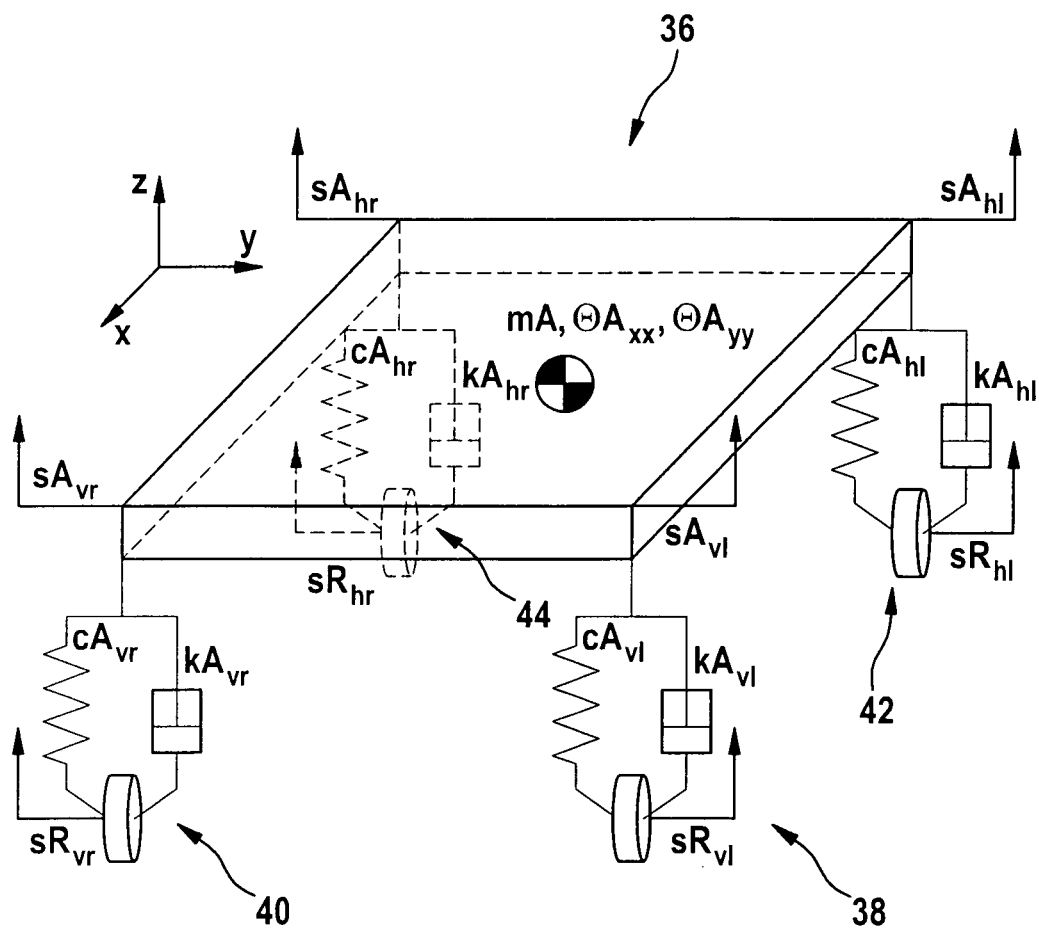
FIG. 4 shows a schematic illustration of a four-wheel motor vehicle model.

FIG. 4 shows a schematic illustration of a four-wheel motor vehicle model 36.

Four-wheel vehicle model 36 is made up of a vibration model 38 for the front left vibration damper, a vibration model 40 for the front right vibration damper, a vibration model 42 for the rear left vibration damper, and a vibration model 44 for the rear right vibration damper, the vehicle body mass no longer being analyzed as point mass but as a disk with mass, as schematically illustrated in FIG. 4. This produces two additional degrees of freedom θAxx und θAyy for the evaluation of the vertical movement.

The four-wheel vehicle module leads to a plurality of differential equations. They include the wheel movements for all four wheels. A lifting movement as well as a pitching and rolling vibration then results for the body overall. The lifting movement is linked to the vehicle mass. The pitching and rolling vibration is linked to the moments of inertia θAxx und θAyy. The pitching and rolling vibrations of the body are able to be measured via the image processing.

In the parameter optimization the parameters are then optimized jointly for all four wheels, so that the simulated movement corresponds to the actual measured movement as best as possible. Consequently:

$$\Sigma(sA_{realFL} - sA_{ModellFL})^2 + (sA_{realFR} - sA_{ModellFR})^2 + (sA_{realRL} - sA_{ModellRL})^2 + (sA_{realRR} - sA_{ModellRR})^2 \to \min.$$

FL, FR, RL and RR are the corresponding measurements of the vehicle body at the front left, front right, rear left and rear right positions.

In the publication by the RWTH Aachen: Institut für Kraftfahrwesen, Wallentowitz, Henning: Vertikal-/Querdynamik von Kraftfahrzeugen [Vertical/Cross Dynamics of Motor Vehicles], 7th edition 2005, ISBN 3-925194-35-5, the single-track model and the four-wheel vehicle model are discussed in detail, and this is known to one skilled in the art.

The procedure for determining parameters corresponds to flow chart 24 according to FIG. 3, the block with simulation model 30 then including the four-wheel vehicle model according to FIG. 4.

According to four-wheel vehicle model 36, the four vibration dampers of test vehicle 4 are tested in the installed state in that the damping measures for all wheels are determined jointly for each vibration damper according to the method of the present invention of the type described above, the lifting, pitching and rolling movements of the body mass being taken into account.

It is therefore possible to assess the pitching behavior, or the pitching and rolling behavior of the vehicle. With the aid of a parameter identification, a comparison of the damping measure both on the left and right axle side is then able to take place, and also of the values of the front axle to the values of the rear axle. The differential equation of the system with the inertia parameters mA, θAxx and θAyy describe a lifting, pitching and rolling movement of the body mass.

Figure 5:
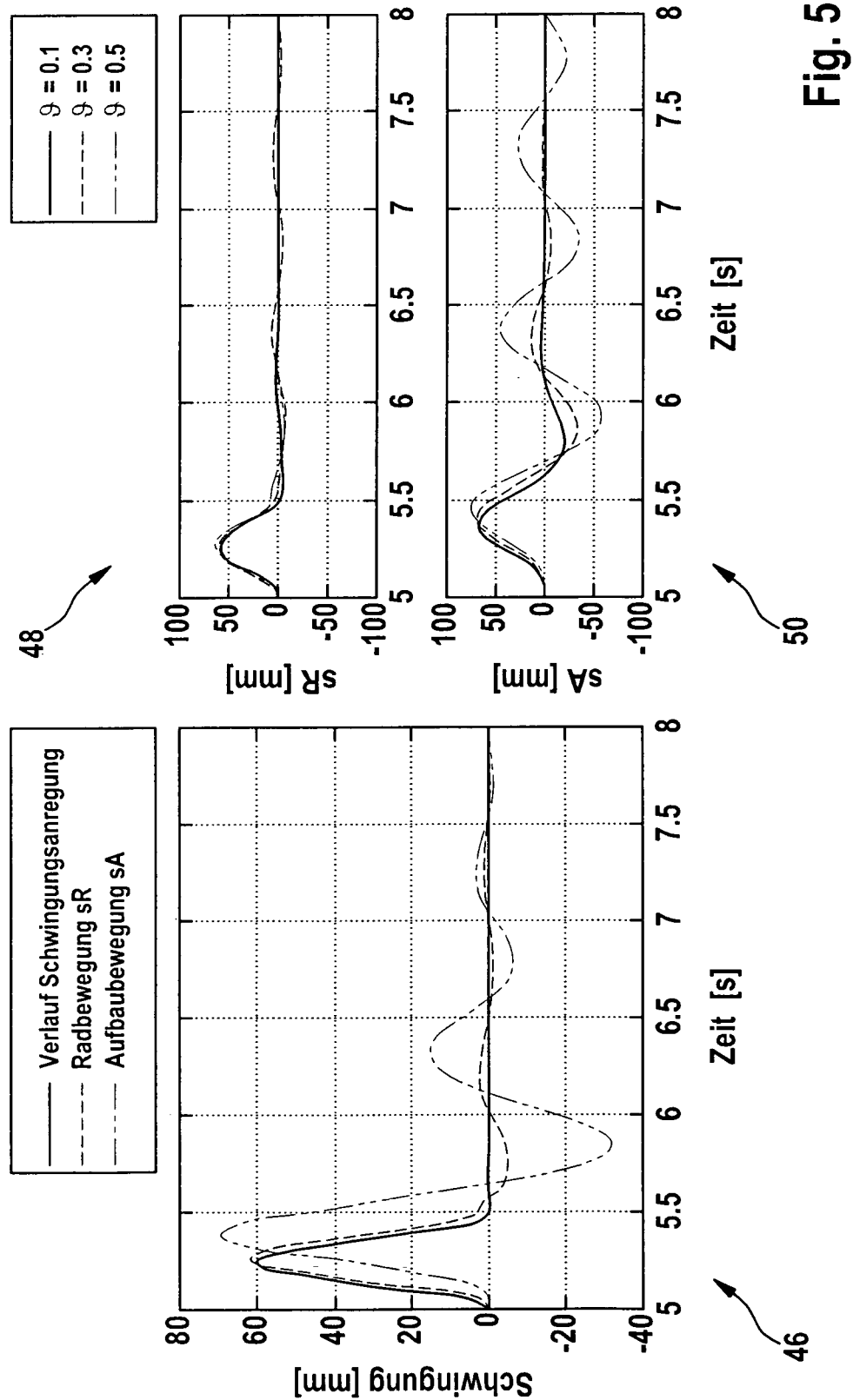
FIG. 5 shows a first, a second and a third vibration characteristic diagram.

FIG. 5 shows a first vibration characteristic diagram 46, a second vibration characteristic diagram 48, and a third vibration characteristic diagram 50.

First vibration characteristic diagram 46 shows three curves in the time characteristic for a damping measure of θ=0.3, i.e., the characteristic of the vibration excitation as solid line, the characteristic of wheel movement sR as evenly interrupted line, and the characteristic of body movement sA as further dashed line. It can be gathered that the vibration excitation takes place in the time interval between second 5 and 5.5, for instance by crossing threshold 8, and that body movement sA lags slightly behind wheel movement sR and has considerably higher amplitude values than the latter. The vibration has come to an end at instant t=8 s.

In second vibration characteristic diagram 48, the characteristic of wheel movement sR is shown for three different damping coefficients; correspondingly, third vibration characteristic diagram 50 illustrates the characteristic of body movement sA for these three damping coefficients. Following the defined excitation between second 5 and 5.5, only one vibration having a low amplitude can be observed; for body movement sA, a vibration having a considerably higher amplitude is visible, which lags slightly behind the vibration of wheel movement sR.

At lower damping coefficients, a higher amplitude will result. When driving across the threshold, the linear speed of the vehicle must be adapted to produce an optimal vehicle response. The vehicle movement varies depending on the threshold length, the threshold form, the driving speed and the body's natural frequency.

A maximum vehicle response is achieved at an excitation frequency f in the range of the body's natural frequency $f_0$. With dropping excitation frequency, the amplitude overshoot, i.e., the ratio $sA_{max}/sR_{max}$, drops rapidly. Above the natural frequency, up to a frequency ratio of $f/f_0=3$, it lies above 1. In order to achieve maximum resolution of measuring system 2 and the greatest possible vehicle response, the vehicle movement should be as large as possible. The natural frequency of the body of a vehicle usually lies at 1 Hz to 1.5 Hz. An excitation frequency f between 1 Hz and 3 Hz is advantageous. The correlation between excitation frequency f, driving speed v and wavelength l is obtained from the following equation:

$$f = \frac{v}{l} \Rightarrow l = \frac{v}{f}$$

In the walking speed range, vehicle speed v lies at 1 to 2 m/s. The threshold length in the driving direction should amount to approximately 250 mm for this speed.

What is claimed is:
1. A computer-implemented method for testing a vibration damper of a motor vehicle in the installed state, comprising the following steps:
 a) setting start values of a damping constant kA, a spring rate cA, and a body mass mA of a vibration model for a wheel of a motor vehicle by means of available vehicle data;

b) inducing a vertical vibration of the motor vehicle by a defined excitation $sR_{real}$;

c) calculating, by a processor, a theoretical body vibration excursion $sA_{model}$ by using the parameters damping constant kA, the spring rate cA, and the body mass mA of the vibration model, and the vertical vibration defined excitation $sR_{real}$;

d) optically detecting the positions of the wheel and a body shell of the motor vehicle for monitoring an observed body vibration excursion $sA_{real}$ at a plurality of detection instants during the vibration;

e) comparing, by the processor, the observed body vibration excursion $sA_{real}$ with the calculated theoretical body vibration excursion $sA_{model}$ at the plurality of detection instants during the vibration;

f) calculating, by the processor, deviations between the theoretical body vibration excursion $sA_{model}$ and the observed body vibration excursion $sA_{real}$ at the detection instants with an error function $$\Delta = \sum_{i=1}^{n} (sA_{real,i} - sA_{Modell,i})^2;$$

g) minimizing, by the processor, the deviations between the theoretical body vibration excursion $sA_{model}$ and the observed body vibration excursion $sA_{real}$ at the detection instants by a model parameterization, whereby the damping constant kA, the spring rate cA, and the body mass mA in the model parameterization are used as start values in each instance;

h) determining, by the processor, the damping constant kA, the spring rate cA, and the body mass mA from the minimized deviation; and i) determining, by the processor, a damping measure $\theta$ of the vibration damper with the parameters of damping constant kA, the spring rate cA, and the body mass mA from the minimized deviation, determining, by the processor, the unknown variables decay constant $\delta$ and natural angular frequency $\omega_0$ with a differential equation system which is defined as $$\sum_{i=1}^{n} [\ddot{s}A_i + 2\cdot\delta\cdot(\dot{s}A_i - \dot{s}R_i) + \omega_0^2\cdot(sA_i - sR_i)]^2 \to 0; \text{ and}$$

determining, by the processor, a body damping measure $\theta$ of the vibration damper on the basis of the decay constant and the natural angular frequency determined by the differential equation.

2. The method as recited in claim 1, wherein for the model parameterization the method steps a) to h) are repeated and the determined values for the damping constant kA, the spring rate cA, and the body mass mA in each time are used as start values.

3. The method as recited in claim 1, wherein the inducing of the vertical vibration of the motor vehicle is achieved with the aid of the defined excitation by driving across a threshold.

4. The method as recited in claim 1, wherein the damping measure $\theta$ of the vibration damper is calculated according to the following formula:

$$\vartheta = \frac{\delta}{\omega_0} = \frac{kA}{2\sqrt{cA\cdot mA}}$$

$\delta$ being the decay constant $$\delta = \frac{kA}{2\cdot mA}$$

and $\omega_0$ being the natural angular frequency $$\omega_0 = \sqrt{\frac{cA}{mA}}.$$

5. The method as recited in claim 1, wherein the inducing of the vertical vibration of the motor vehicle is implemented with the aid of the defined excitation $sR_{real}$ using an excitation frequency that lies between 1 Hz and 3 Hz and within the range of the body's natural frequency $$f_0 = \frac{1}{2\pi}\sqrt{\frac{cA}{mA}}.$$

6. The method as recited in claim 1, wherein the method is implemented for the wheels of an axle in order to determine the damping measures $\theta$ for the wheels of the axle, and wherein the lifting, pitching and rolling movements of the body mass are taken into account in determining the damping measures $\theta$ for the wheels of the axle.

7. A vibration damper test system for a motor vehicle, comprising:

at least one measuring head configured to perform optical detection of the positions of a wheel and a body shell of the motor vehicle at a plurality of detection instants;

an excitation device for inducing a vertical vibration in the motor vehicle; and a data processing unit configured to receive measuring data from the measuring head and to implement a method for testing a vibration damper of a motor vehicle in the installed state, the data processing unit including:

a unit for setting start values of a damping constant kA, a spring rate cA, and a body mass mA for a wheel of a motor vehicle;

a unit for calculating a theoretical body vibration excursion $sA_{model}$;

a unit for monitoring an observed body vibration excursion $sA_{real}$ at a plurality of detection instants during the vibration;

a unit for comparing the observed body vibration excursion $sA_{real}$ with the calculated theoretical body vibration excursion $sA_{model}$ at the plurality of detection instants during the vibration;

a unit for a model parameterization by minimizing deviations between the theoretical body vibration excursion $sA_{model}$ and an observed body vibration excursion $sA_{real}$ at the detection instants, and determining the damping constant kA, the spring rate cA, and the body mass mA from the minimizing deviations; and a unit for determining a damping measure $\theta$ of the vibration damper, determining the unknown variables decay constant $\delta$ and natural angular frequency $\omega_0$ with a differential equation system which is defined as $$\sum_{i=1}^{n}[\ddot{s}A_i + 2\cdot\delta\cdot(\dot{s}A_i - \dot{s}R_i) + \omega_0^2\cdot(sA_i - sR_i)]^2 \to 0;\text{ and}$$

determining a body damping measure $\theta$ of the vibration damper on the basis of the decay constant and the natural angular frequency determined by the differential equation.

* * * * *